United States Patent
Greening et al.

[15] 3,655,950
[45] Apr. 11, 1972

[54] PERCENTAGE ELONGATION CALIBRATED DIGITAL PULSE DELETER

[72] Inventors: Donald J. Greening, Theinsville; Paul M. Kintner, Bayside; Sanford M. Strand, West Allis, all of Wis.

[73] Assignee: Cutter-Hammer, Inc., Milwaukee, Wis.

[22] Filed: Oct. 22, 1969

[21] Appl. No.: 868,305

[52] U.S. Cl. ..........................235/92 PE, 318/314, 318/309, 340/347 DD, 72/249, 72/234, 328/42
[51] Int. Cl. ..............................H03k 13/258, B21b 37/00
[58] Field of Search ..................235/150.3, 150.31; 328/42; 318/314

[56] References Cited

UNITED STATES PATENTS 3,404,343  10/1968  Strand ....................................328/42

Primary Examiner—Eugene G. Botz
Attorney—Hugh R. Rather

[57] ABSTRACT

A digital pulse deleter for use with digital control systems of electric motors driving work stand rolls in processing lines to afford selective adjustment of motor speeds calibrated in terms of percentages of elongation between successive work stands. The deleter can be adjusted by readily made changes in electrical interconnections to be determinative of what percentage of input pulses will and what percentage of such pulses will not be subject to deletion by selector switches. Operation of the selector switch permits selection of the increments of pulses subject to deletion that will be actually deleted with such increments being calibrated as a percentage or a per unit value of elongation or draw. The percentage of total deleter input pulses not subject to deletion is determinative of the maximum elongation or draw ratio to which the deleter will be so calibrated.

7 Claims, 9 Drawing Figures

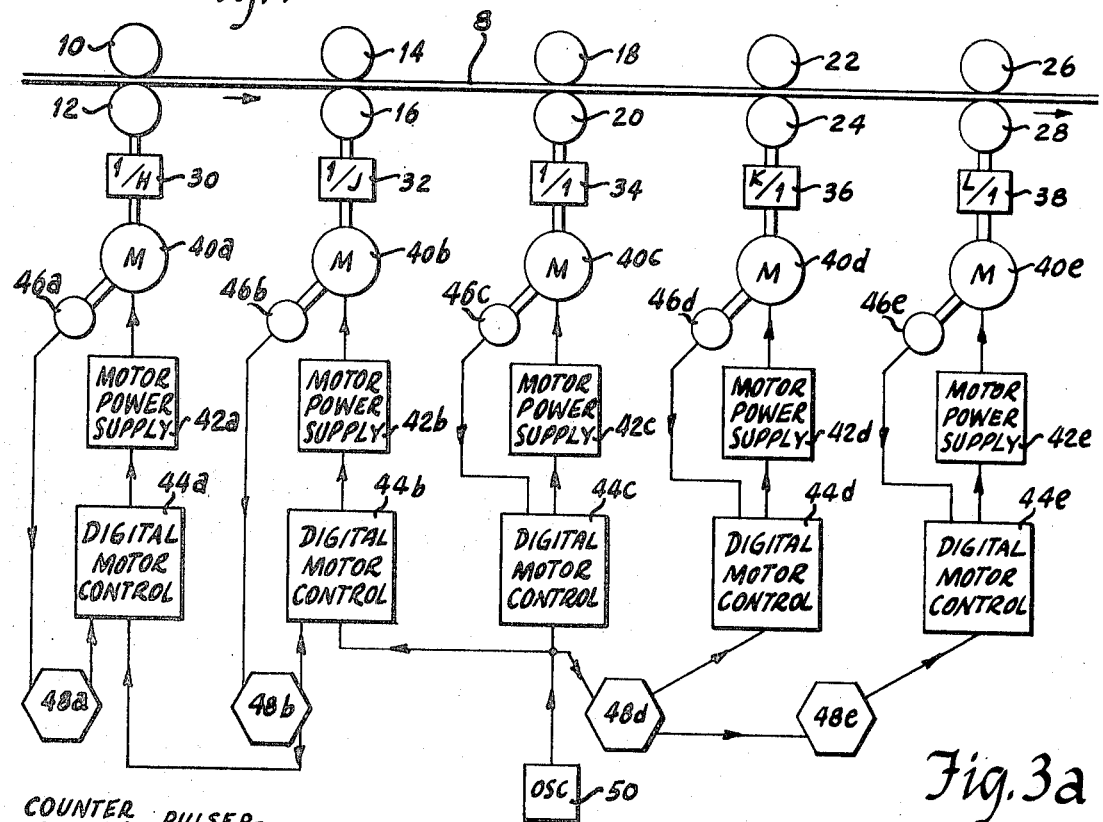
Fig. 1
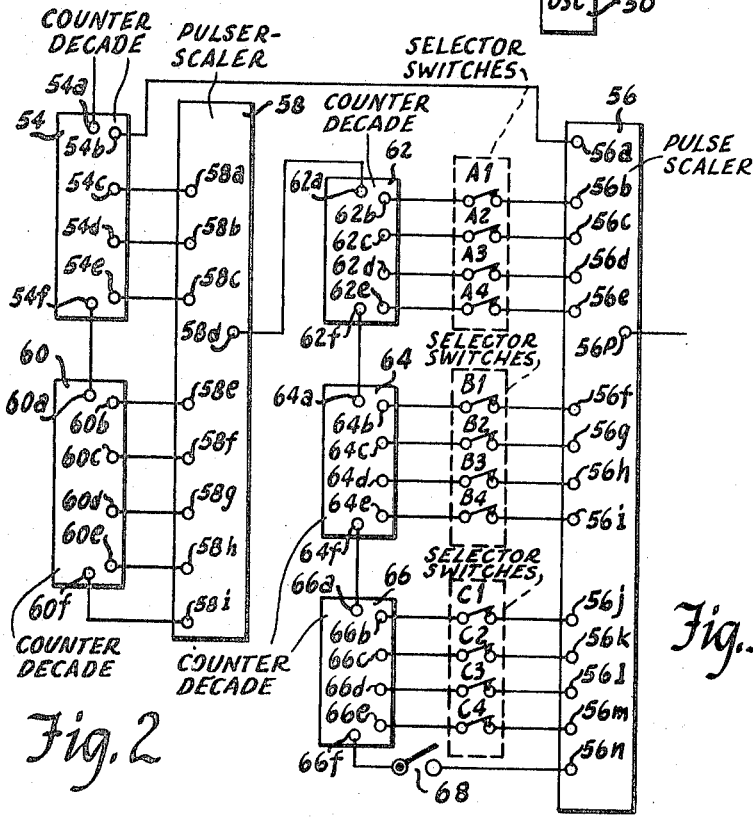
Fig. 2
Fig. 3a
| SWITCH DELETION | | | | |
|---|---|---|---|---|
| % | C1 | C2 | C3 | C4 |
| .0 | X | X | X | X |
| .1 | X | X | O | X |
| .2 | X | O | X | X |
| .3 | X | O | X | O |
| .4 | X | O | O | O |
| .5 | O | X | X | X |
| .6 | O | X | O | X |
| .7 | O | X | O | O |
| .8 | O | O | X | O |
| .9 | O | O | O | O |
Fig. 3b
| SWITCH DELETION | | | | |
|---|---|---|---|---|
| % | B1 | B2 | B3 | B4 |
| 0 | X | X | X | X |
| 1. | X | X | O | X |
| 2. | X | O | X | X |
| 3. | X | O | X | O |
| 4. | X | O | O | O |
| 5. | O | X | X | X |
| 6. | O | X | O | X |
| 7. | O | X | O | O |
| 8. | O | O | X | O |
| 9. | O | O | O | O |

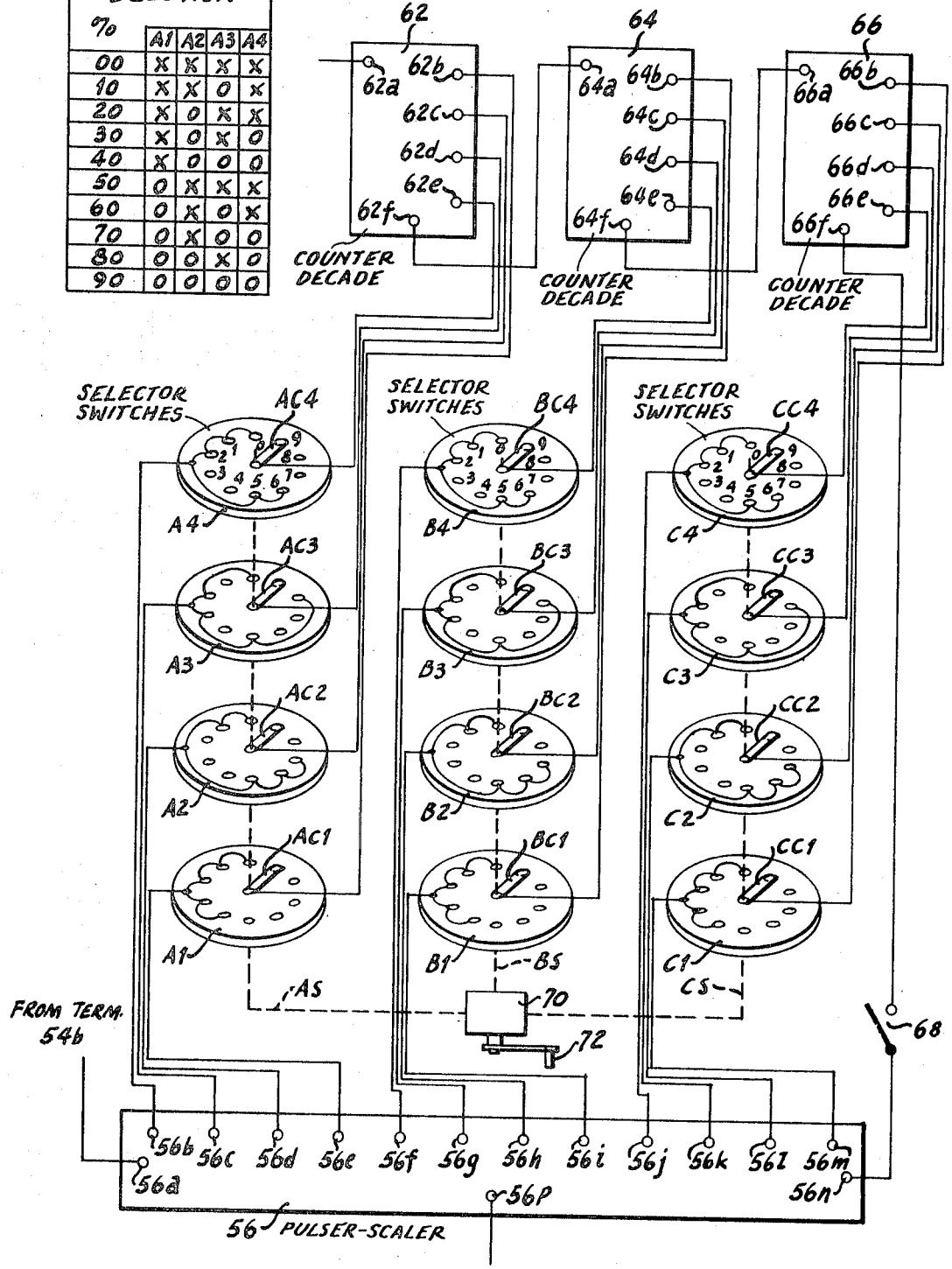

Fig. 6
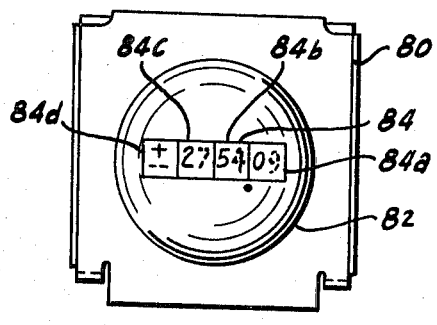
Fig. 7
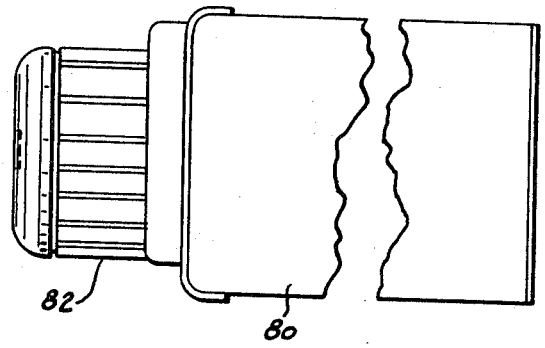
Fig. 5
| FOR MAXIMUM DRAW $e =$ | CONNECTION TO TERMINAL 56a OF PULSER-SCALER 56 | MAXIMUM DRAW RANGE |
|---|---|---|
| $(\frac{1}{.99} - 1.) = 1.01\%$ | TERM. 60e | +1.0 % <br> -98.9 % |
| $(\frac{1}{.98} - 1.) = 2.04\%$ | TERM. 60c | +2.0 % <br> -97.9 % |
| $(\frac{1}{.95} - 1.) = 5.26\%$ | TERM. 60b | +5.3 % <br> -94.6 % |
| $(\frac{1}{.90} - 1.) = 11.11\%$ | TERM. 54e | +11.1 % <br> -88.8 % |
| $(\frac{1}{.80} - 1.) = 25\%$ | TERM. 54c | +25. % <br> -74.9 % |
| $(\frac{1}{.50} - 1.) = 100\%$ | TERM. 54b | +100. % <br> +0.1 % |
Inventors
Donald J. Greening
Paul M. Kintner
Sanford M. Strand
By H R Rather
Attorney

PERCENTAGE ELONGATION CALIBRATED DIGITAL PULSE DELETER

BACKGROUND OF THE INVENTION

Industries producing webs of textiles, plastic films, paper, metal, etc., use continuous processing lines in which the material thickness is most often decreasing and its length is increasing as it passes between work stands. Usually such work stands consist of paired rolls through which the material passes, and the same must be driven at precise speed ratios to provide, or accommodate, the elongating material. In some instances, due to controlled application of heat, the material may shrink between successive work stands providing shrink or negative elongation.

The frequency based digital motor control systems of the type disclosed in the Strand et al. U.S. Pat. No. 3,331,006 have proved very desirable in controlling the drive motors for work roll stands in such material processing lines because the speed ratios of the motors can be set by means of digital switches and held to zero average error over any period of time. A single master frequency speed reference can be used and speed ratios at successive work stands may then be provided by deletion of pulses in proportion to the change in speed ratio desired between successive work stands.

As understood in the aforementioned material processing industries, elongation of material between any successive work stands is defined as the ratio:

$$E = (L_F - L_I)/(L_I)$$

Where:
$E$ = Elongation
$L_I$ = Per Unit Length at Input of Initial Stand (1.0)
$L_F$ = Per Unit Length at Output of Final Stand
       (1.0 + % Stretch)/100

It will be observed that for stretch or positive elongation $E$ will be positive, and for shrink or negative elongation, $E$ will be negative.

Providing reference motor speed settings for the work stand driving motors calibrated in terms of per unit or percentage elongation would be a considerable and meaningful convenience to such material processing industries. As far as is known, speed regulation devices of the digital pulse type have not heretofore been so calibrated.

OBJECTS OF THE INVENTION

It is a primary object of the present invention to provide a novel form of digital pulse deleter affording pulse deletion increments calibrated as per unit or percentage elongation.

Another object of the invention is to provide a pulse deleter design which can be adapted to provide any practical increments of elongation calibration.

A still further object is to provide a pulse deleter of the aforementioned kind which can be adapted to a number of different maximum draw ratios between work stands by simple changes in certain electrical interconnections.

Other objects and advantages of the invention will hereinafter appear.

SUMMARY OF THE INVENTION

The pulse deleters of the present invention are designed to provide per unit or percentage adjustments of elongation in terms of maximum elongation obtainable when the drive motors and pulse generators of successive work stand rolls are providing an equal number of pulses per unit time. The system utilizes binary coded decimal counter modules and pulser-scaler modules like that disclosed in Strand U.S. Pat. No. 3,404,343.

A basic form of the deleter uses two input cascaded binary coded decimal counter decades which have a plurality of count output terminals connected to respective input terminals of an intermediate stage pulser-scaler, and at least one output terminal connected directly to an input terminal of a final stage pulser-scaler. The output of the intermediate stage pulser-scaler is connected to the input of three cascaded binary coded decimal counter decades for 0.1 percent resolution which have their count output terminals connected in series with selector switches to input terminals of the first pulser scaler. The output terminal of the final stage pulser scaler is connectable to a frequency based motor control system as a speed reference.

The deleter selector switches are connected to a coordinating operating mechanism to provide incremental pulse detection changes in sequential order, which are required for calibration in per unit of elongation.

THE DRAWINGS

The accompanying drawings illustrate preferred embodiments of the invention which will now be described in detail, it being understood that the embodiments illustrated are susceptible of modifications in respect of details without departing from the scope of the invention.

FIG. 1 is a diagrammatic showing of a material processing line having electric driving motor control systems incorporating the invention.

FIG. 2 is a block diagram of a pulse deleter incorporating the invention.

FIGS. 3a to 3c are tables depicting the schedules of operation for selector switches in the deleter of FIG. 2.

FIG. 4 is a block diagram of a portion of a deleter like that shown in FIG. 2 showing another preferred form for pulse deleting selector switches.

FIG. 5 is a table showing the relationship between certain selectable terminal connections for the deleters of FIGS. 2 and 4 and calibrated elongation or draw ranges afforded.

FIG. 6 is a front view of a preferred rotary selector switch with digital indicating means useable in the deleter of FIG. 4, and FIG. 7 is a fragmentary view in side elevation of the switch of FIG. 6.

DESCRIPTION OF THE PREFERRED EMBODIMENTS

FIG. 1 depicts a processing line comprising a plurality of pairs of coupled work rolls 10–12, 14–16, 18–20, 22–24 and 26–28 which may be assumed to progressively effect elongation of a continuous length of material 8. The pairs of work rolls from left to right are connected to gear boxes 30, 32, 34, 36 and 38 which are in turn each connected for driving by individual DC motors 40a to 40e.

Each of the motors may assumed to be connected for energization to motor power supplies 42a to 42e, which are each respectively controlled by like digital motor control systems 44a to 44e. It may be assumed that each pair of the motor power supplies and digital motor control systems are like that disclosed in the Strand et al. U.S. Pat. No. 3,331,006 and in the Strand U.S. Pat. No. 3,349,308 to which reference should be made for a complete and detailed understanding.

The motors 40a to 40e drive digital tachometers or pulse generators 46a to 46e respectively. Pulse generator 46a is connected to feed output pulses to a pulse deleter 48a which in turn is connected to feed output pulses to digital motor output system 44a as a feedback signal. Pulse generator 46b feeds output pulses to a pulse deleter 48b, which in turn supplies output pulses to motor control system 44a as a reference signal and 44b as a feedback signal. A master or base reference digital oscillator 50 supplies output pulses to digital motor control systems 44b and 44c as reference signals and to pulse deleter 48d. Pulse tachometer generators 46c, 46d and 46e feed their respective output pulses directly to their associated digital motor control systems 44c, 44d and 44e as feedback signals. Adjustable pulse deleter 48d is connected to supply output pulses to digital motor control system 44d and to a pulse deleter 48d which is connected to supply its output pulses to digital motor control systems 44e.

The number of draw units, either upstream or downstream from the master speed unit (40c) can be extended as required for any particular application. Additional upstream units will have the same connection relationship to the last upstream unit as 44a, 46a and 48a have to 44b, 46b and 48b. Additional downstream units will have the same connection relationship to the last downstream unit as 44e and 48e have to 44d and 48d.

Assuming equal roll diameters for all units, gear box 34 may be assumed to provide a 1 to 1 speed ratio between motor 40c and the coupled rollers 18 and 20. Gear boxes 36 and 38 may be assumed to provide a step up speed ratio of K to 1 and L to 1 respectively between motors 40d and 40e and their respective pairs of coupled rollers 22–24 and 26–28. The letters K and L represent numerical values where: L>K>1. Gear boxes 30 and 32 may be assumed to provide step down speed ratios relative to that of gear box 34 and that they have ratios 1 to H and 1 to J. The letters H and J represent numerical (< 1) values where: 1>J>H. Accordingly, the following relationship of gear ratios holds true for the gear boxes 30 to 38.

L>K>1>J>H

When the motors 40a to 40e are running at the same speed then, due to the aforementioned gear ratios, the material 8 will progressively be pulled faster between each pair of rolls in a ratio equal to step up in gear ratios between any adjacent pairs of coupled work rolls. If the material 8 is stretchable, the amount of stretch or "elongation" between any successive pairs of coupled work rolls will then be a "positive" maximum and a direct function of the difference in gear ratios.

It will be observed that due to the input of pulse deleter 48e being connected to the output of deleter 48d, that the former can either feed the same number of pulses per unit time occurring at the output of the latter, or some lesser number during the same time to the reference input of motor controller 44e depending upon the deletion adjustment of the former. Thus, if deleter 48d is set for zero pulse deletions, motors 40d and 40e will run at the same speed, and elongation of the material 8 will be the maximum possible in the ratio of L/K. Now considering the coupled roll pairs 14–16 and 18–20 it will be seen that if their respective driving motors 40b and 40c operate at the same speed that the maximum elongation possible between these coupled roll pairs will be in directed proportion to the gear rates in the gear boxes 32 and 34 or (1–J/J). With motors 40a and 40b running at equal speed the maximum elongation of the material 8 between coupled rolls 10–12 and 14–16 will be in the ratio of (J–H/H) and will occur if pulse deleter 48a is set to delete zero pulses per unit time fed into it from tachometer generator 46a.

When pulse deleters of the type now to be described in conjunction with FIG. 2 are used for the deleters 48a to 48c in the system of FIG. 1 then speed changes effected by settings of their selector switch will provide motors speed changes which may be calibrated in terms of percentages of elongation. As hereinbefore indicated, maximum elongation between adjacent roll stands occurs when their driving motors run to provide equal number of pulses per unit of time. As will hereinafter be apparent, selective operation of the switches A1 to A4, B1 to B4 and C1 to C4 permits changes in increments of 0.1 percent of maximum draw range.

As shown in FIG. 2, the preferred form for each of the pulse deleters 48a to 48c comprises a first digital pulse counter decade 54 having a input pulse terminal 54a and five count output terminals 54b to 54f. Count output terminal 54b is directly connected to the input terminal 56a of a pulser-scaler 56 which has additional input terminals 56b to 56n and a single pulse output terminal 56p. The other count output terminals 54c to 54e of counter 54 are connected to input terminals 58a to 58c of a second pulser-scaler 58 which has a single pulse output terminal 58d.

Output terminal 54f of decade 54 connected to input terminal 60a of a second decade counter which has five count output terminals 60b to 60f. Count output terminals 60b to 60f are connected to input terminals 58e to 58i of pulser-scaler 58 respectively.

The pulse output terminal 58d of pulser-scaler 58 is connected to input terminal 62a of a third digital pulse counter 62 like counters 54 and 60 and has five count output terminals 62b to 62f. Count output terminals 62b to 62e are connected in series with selector switches A1 to A4 respectively of a switch unit A to input terminals 56b to 56e of pulser-scaler 56, and output terminal 62f is connected to input terminal 64a of a fourth digital counter decade 64 like decades 54, 60 and 62.

Counter 64 has four count output terminals 64b to 64e connected in series with selector switches B1 to B4 respectively of a switch unit B to input terminals 56f to 56i of pulser-scaler 56. The fifth count output terminal 64f of counter 64 is connected to input terminal 66a of a fifth digital counter decade 66.

Counter 66 has four count output terminals 66b to 66e connected in series with selector switches C1 to C4 of a switch unit C to input terminals 56j to 56m of pulser-scaler 56. The fifth count output 64f is connected in series with a knife switch 68 to input terminal 56n of pulser-scaler 56.

The counter decades 54, 60, 62, 64 and 66 may be assumed to be designed and internally connected to provide count signals at their respective output terminals in binary coded decimal mode for each series of 10 input pulses. Pulser scalers 56 and 58 are preferable of the circuit configuration disclosed in the Strand U.S. Pat. No. 3,404,343 and provide a pulse of desired shape and duration at their output terminals 56p and 58d for each count pulse impressed at one of their input terminals.

Now referring again to FIG. 1, let it be assumed that all of the work stand rolls are of equal diameter, and that gear box 36 has a step up speed ratio of 2 to 1 when gear box 34 has a unity speed ratio. If the deleter shown in FIG. 2 is used for deleter 48d, then a draw range of 0.1 to 100 percent will exist between work stand roll sets 18–20 and 22–24. 100 percent draw, or stretch of the material will occur when motors 40c and 40d are running at equal speeds. Equal speeds will of course occur when 46c and 46d are producing equal number of pulses per unit of time and all of the switches in switch units A, B and C of FIG. 2 are closed, and the same number of pulses are produced at output terminal 56p of the deleter as fed in at input terminal 54a.

With counter decade 54 internally connected to provide count output pulses in a binary coded decimal mode, it will be seen that the scaling weights at terminals 54b to 54f of counter decade 54 per 1,000 pulses at terminal 54a and at terminals 62b to 62f of counter decade 62 per 1,000 pulses at terminal 62a will be 500, 200, 100, 100 and 100. The scaling weights for the same number of input pulses at terminal 62a will be 50, 20, 10, 10 and 10 at the terminals 64b to 64f of counter decade 64 and will be 5, 2, 2, 1 and 1 at terminal 66b to 66f of counter decade 66. As terminal 54b is directly connected to input terminal 56a of pulser scaler 56 and terminal 66f is also directly connected to terminal 56n, a minimum of 501 pulses out of each 1,000 generated by oscillator 50 will be fed to digital motor control module 44d. This determines the minimum speed at which motor 40d can run. As will hereinafter be more fully explained such minimum speed provides a draw of 0.1 percent of maximum between work stand rolls 18–20 and 22–24.

Hereinbefore, the term elongation ($E$) was referred to in a formula in terms of initial per unit length ($L_I$) and final per unit length ($L_F$). It can also be demonstrated that elongation ($E$) can be expressed as:
Where:

$$E = \frac{L_F - L_I}{L_I} = \text{Elongation}$$

This can be rewritten as:

$$E = \frac{P_E(X_E) - P_I(X_I)}{P_I(X_I)}$$

where $$P_E(X_E) = L_F$$
$$P_I(X_I) = L_I$$

$$= \frac{P_E(X_E)}{P_I(X_I)} - 1$$

and $P_E$ = number of pulses from elongation roll
$X_E$ = linear roll surface per pulse of elongation roll
$P_I$ = number of pulses from initial roll
$X_I$ = linear roll surface per pulse of initial roll Under these conditions, if $P_E = P_I$ at maximum elongation, then $(X_E)/(X_I) - 1$ = Maximum Elongation. This can be accomplished by proper gearing of the motors to rolls, and of pulse tach generators to the motors.

Now with the deleter 48d of the form shown in FIG. 2 if a maximum draw of 2 to 1 is desired, then $P_I = P_E$ at maximum elongation, and $X_E = 2X_I$. In other words linear roll surface travel per pulse of the elongation roll is two times the roll surface travel per pulse of the initial roll.

It will be noted that as only 50 percent of the pulses fed in at input terminal 54a of the deleter can be deleted, deletion of one pulse in deleter 48c will be 1/500 of each 1,000 input pulses, or 1/1000 of each 2,000 input pulses. Based on a cycle of 2,000 input pulses, 2 feet per output pulse represents 2/2000 or 0.1 percent speed difference in terms of resulting elongation $E$.

The tables of FIGS. 3a to 3c depict the required pattern of closure of the switches of switch units, A, B and C for any desired percentage of elongation desired between 0.1 percent and 100 percent of maximum possible draw. The indication "X" below any switch column designates "closed" condition of the switch at the top of the column while "O" in the same space indicates "open" condition of that switch. For example, if an elongation of 65.3 percent is desired for the arrangement set up for 100 percent maximum elongation outlined above, this would require deletion of 100−65.3 = 34.8 percent. This would require closure of switches A1, A3, B1 and C3 of FIGS. 3c, 3b and 3a respectively.

It will be appreciated that the pulse deletion of FIG. 2 can also be used for any of the deleters 48a to 48d in the material processing drive control system of FIG. 1. In the case of deleters 48a and 48b, settings of switch units A, B and C to provide a lesser number of pulses than base oscillator 50, or a preceding pulse deleter, and will cause the digital motor control unit 44a or 44d to run at a proportionally faster speed and thereby reduce the elongation of the material between either work stand rolls 10–12 and 14–16 and 18–20 as the case may be. The percentage of elongation will depend upon the pattern of closure of the switches of switch units A, B and C hereinbefore discussed.

FIG. 4 shows a portion of the deleter of FIG. 2 together with another form for switch units A, B and C inclusive of a coordinating operating mechanism required to provide direct reading elongation calibration. More particularly each of the switch units A, B and C have switch decks A1 to A4, B1 to B4 and C1 to C4. Cooperating rotary contactors AC1 to AC4, BC1 to BC4 and CC1 to CC4 which are fixed to rotary operating shafts, AS, BS and CS. Each of the switch decks has ten stationary contacts spaced at equal rotary angles of 36. The stationary contacts on the respective decks are interconnected with the input terminal 56b to 56m of pulser scaler 56 as shown.

Operating shafts AS, BS and CS are connected internally in a Geneva or Odometer type of gear mechanism 70. It may be assumed that by manual turning of a crank 72 fixed on an input shaft to gear box 70 that the latter provides operation of shafts AS, BS and CS in coordinate turns ratio. For every revolution of shaft CS it may be assumed that shaft BS is indexed one-tenth of a revolution. For every complete revolution of shaft BS shaft AS is indexed one-tenth revolution. Thus by appropriate operation of crank 72 any of the combinations set forth in the tables of FIGS. 3a to 3c between 0.1 percent and 100 percent elongation can be obtained, in step increments of 0.1 percent. As will hereinafter be explained in connection with FIGS. 6 and 7, this form for the selector switches A, B and C permits use of digital indication which reads numerically directly in terms of percentage of elongation.

While the deleters of FIGS. 2 and 4 will provide adjustment of draw or elongation between 0.1 percent and 100 percent in increments of 0.1 percent when the draw range is 2 to 1 (100 percent stretch) with equal relative motor speeds of adjacent work stands, it can be used with other draw ranges as well. FIG. 6 shows how the preferred deleter of FIG. 2 can be readily changed to be adapted to other draw ranges. For example, if the material between work stand rolls 18–20 and 22–24 is to be elongated a maximum of 25 percent, then gear box 36 would be selected to provide a step up speed ratio of 1.25 to 1 and each pulse from 46d will represent 1.25 times the length of material or linear roller surface travel of the length per pulse of 46c. Then as shown in the middle column, second row from the bottom in FIG. 5 terminal 54c would be connected directly to terminal 56a of pulser scaler 56 and 54b would be connected to terminal 58a of pulser scaler 58. Accordingly 20 percent of all pulses at input terminal 54a would pass directly to pulser-scaler 56 and appear as output pulses at output terminal 56p. Thus for every 125 input pulses at input terminal 54a, 25 would appear at input terminal 56a and 100 at input terminal 62a of decade 62.

Now it will be observed that if switch units A and B are set to provide 25 percent deletion (125–25 pulses) that 75 pulses out of every 100 appearing at input terminal 62a will appear as input pulses at the input terminals of pulser scaler 56, plus 25 pulses from 54c to input terminal 56a. Thus, a total of 100 pulses will appear at output terminal 56p for every 125 input pulses at terminal 54a. Under such setting of switch units A, B and C it will be seen that no stretch will occur between work stand rolls 18–20 and 22–24, since the relative speed of the elongation roll is 100/125, and the length per pulse is 1.25 times the initial roll pulses. $\therefore 100/125 \times 1.25 = 1.0 =$ Zero elongation.

It will also be appreciated that for draw settings of switch units A, B and C less than 25 percent deletion that motor 40d will operate at relative speeds affording a "shrink" condition of the material. In certain processing of materials controlled heating of the same will cause shrinkage and the work roll stands 22–40 for example would then have to run at such relative speeds as to accomodate the material shrinkage. With all switches of units A, B and C open, motor 40d will drive rolls 22–24 at a relative speed to provide exactly 74.9 percent negative (shrinkage).

FIG. 5 shows how other draw or elongation ranges can be obtained by appropriate connection of various count output terminals of decades 54 and 60 directly to input terminal 56a of pulser scaler 56. This table holds true for counter decades connected for binary coded decimal count outputs only.

Those skilled in the art will recognize that the deleter of FIG. 2 can be readily modified to provide either coarser or finer increments of pulse deletions. If pulse deletions affording elongation incremental changes of 1 percent will suffice then counter decade 66 and switch unit C can be eliminated. On the other hand if a finer incremental change, say 0.01 percent is desired then an additional counter decade and four switch selector switch units can be interposed between count output terminal 66f of decade 66 and input terminals of pulser-scaler 56.

It will also be apparent that the deleter of FIG. 2 can also be modified to be calibrated to maximum draw or elongation ranges intermediate those specified in the right hand column of the table of FIG. 5. Such modification consists of connecting one or another of the count output terminals 62b, 62c and 62e directly to their respective associated input terminals 56b, 56c and 56e of pulser-scaler 56 without the interposition of switch A1, A2 and A4 therebetween as the case might be.

A commercially available form of selector switch known as the Series RS-G Rotary Selector Switch, manufactured by the Precision Products Division of the Chicago Dynamics Industries, Inc., Chicago, Illinois is ideally suited for use in the pulse deletion system of FIG. 4. Such rotary selector switch is shown and described in the Koci U.S. Pat. No. 3,132,217 assigned to that Company. It provides the coordinated operation between switch units A, B & C in the manner hereinbefore described in conjunction with FIG. 4, and in addition has a decimal digit indicating dial.

FIGS. 6 and 7 show the outer form of a rotary selector switch constructed in accordance with the Koci patent. It comprises an enclosure 80 in which is housed the switch decks, rotary contactors, rotary operating shaft, and Geneva mechanism similar to that described in conjunction with FIG. 4. It is also provided with a knob 82 which has incorporated therein a digital indicating mechanism 84 of a well known type. For use with the pulse deleting system of FIGS. 4, each of the digit wheels 84a, 84b and 84c preferably has two numerals, with the left hand numeral being black, and the right hand numeral being red or some other contrasting color. If the periphery of each digit wheel were laid flat the pattern of black and red numerals would be as follows:

| Black | Red |
|-------|-----|
| 9 | 0 |
| 8 | 1 |
| 7 | 2 |
| 6 | 3 |
| 5 | 4 |
| 4 | 5 |
| 3 | 6 |
| 2 | 7 |
| 1 | 8 |
| 0 | 9 |

The left hand most indicating wheel 84 would have a black + in one indicating position in lieu of "0" and a red — in the indicating position immediately adjacent thereto in lieu of "9". The black numbers then proceed in the normal numerical direction (1, 2, 3, etc.) indicating the decade unit of positive elongation. The red numbers then proceed in the reverse numerical direction (1 for 8, 2 for 7, 3 for 6, etc.) indicating negative elongation or shrinkage.

With the preferred marking of the digit indicating wheels as above discussed in conjunction with FIG. 6, the rotary selector switch can be readily calibrated to any of the draw ranges set forth in the table of FIG. 5 or other selected elongation ranges. For example, if the elongation or draw range is to be +25 percent to − 74.9 percent and switch 68 is closed, then the selector switch is operated to a limit where all switch units are closed. The dial mechanism 84 is then declutched from knob 82 and then set so that the black numerals indicate +25.0, and then re-clutched to move its digit wheels in synchronism with rotation of the knob 82. Then as the knob 82 is rotated to turn the switch operating shaft to the other limit wherein all switch units are open, the digit wheel 84a would change 0.1 for each 36° of knob rotation, assuming a 1:1 ratio between the knob and switch operating shaft. When knob 82 reaches the last mentioned limit of rotation, the digit wheels would then have a red indication of −74.9 percent.

It is required that switch 68 be open if the selector switch is to give correct numerical indications in the negative draw range. If the draw range is between 100 percent and 0.1 percent and switch 68 is closed the dial reading will be correct, but if open it will be 0.1 percent low. In other words, under the last mentioned condition with all switch units in the selector switch closed the dial indicating wheels will read +99.9 percent when no pulses are deleted.

We claim:

1. A digital pulse deleter comprising:
   a. means for registering each of a continuous series of input pulses,
   b. means directly connected to the first mentioned means and providing output pulses corresponding to a predetermined percentage of input pulses registered in said first mentioned means, and
   c. means connected between said first mentioned and the second mentioned means for selecting the number of the remaining percentage of input pulses registered in said first mentioned means that are effective to also provide output pulses at said second mentioned means.

2. The pulse deleter defined by claim 1 wherein the direct connection between the first mentioned means and the second mentioned means can be selected to provide one or more of a plurality of predetermined percentages of said input pulse.

3. A digital pulse deleter comprising:
   a. a binary coded decimal counter having a pulse input terminal and a plurality of count output terminals,
   b. a pulser-scaler having a pulse output terminal and a plurality of pulse input terminals with at least one thereof, being connected to a count output terminal of said counter,
   c. a second pulser-scaler having a pulse output terminal and a plurality of input terminals connecting respectively to the other output terminals of said counter,
   d. a second binary coded decimal counter having an input terminal connected to the output terminal of said second pulser-scaler, and having a plurality of count output terminals, and
   e. selector switch means interposed between output terminals of said second counter and other input terminals of the first mentioned pulser-scaler.

4. A pulse deleter for use as a speed reference pulse signal source in digital control systems for electric motors driving work stands or the like in material processing line comprising:
   a. A pulse counter having an input terminal and a plurality of count output terminals,
   b. a pulser-scaler having a plurality of input terminals which are all connected to respective ones of some of the count output terminals of said pulse counter and having a single output terminal which delivers a pulse of given duration and amplitude for each voltage change of a given direction and magnitude impressed at any of its input terminals,
   c. a second pulse counter having its input terminal connected to the output terminal of said pulser and having a plurality of count output terminals,
   d. a second pulser-scaler like the first mentioned pulser which has at least one of its input terminals connected directly to one of the other of the count output terminals of the first mentioned pulse counter,
   e. and means including individual switch elements connected between some of the output terminals of said second pulse counter and said second pulser-scaler input terminals, said second pulser-scaler providing an output pulse for each input pulse at said one of its input terminals and according to selected closure of said individual switch elements providing additional output pulses for each input pulse to each input terminal that is effective to receive pulses from said second pulse counter.

5. A pulse deleter in accordance with claim 4 wherein said switch means comprises at least two multi-position, rotary operating shaft switch units and a Geneva type gear mechanism between said operating shafts to provide indexing of one shaft one rotary switch position each time the other shaft moves between two given switch positions in each revolution of operation.

6. A pulse deleter in accordance with claim 5 wherein said switch means includes digital numerical indicating means which are settable at one limit of operation of said switch means to provide a direct numerical indication of the percentage of material elongation afforded with no pulses deleted, and wherein said indicating means for each different operating position between said one limit and another opposite limit affords numerical indications decimally calibrated in terms of percentage of material elongation corresponding to the number of pulses that are deleted in any of such switch operating positions.

7. The pulse deleter defined in claim 1 wherein said first mentioned means is so connected directly with said second mentioned means that the latter provides output pulses equal in number to 50 percent of the input pulses to said first mentioned means, and wherein said means connected between said first and second mentioned means affords selection of the number of the remaining 50 percent of the input pulses to said first means that are effective to provide output pulses at said second mentioned means.

* * * * *